United States Patent
Cannon et al.

(10) Patent No.: US 10,202,096 B2
(45) Date of Patent: Feb. 12, 2019

(54) THRUST VECTOR TUNING OF INFLATOR DEVICES

(71) Applicant: AUTOLIV ASP, INC., Ogden, UT (US)

(72) Inventors: Steven M. Cannon, Elwood, UT (US); Anthony M. Young, Malad, ID (US); Shawn Lang, Ogden, UT (US)

(73) Assignee: AUTOLIV ASP, INC., Odgen, UT (US)

( * ) Notice: Subject to any disclaimer, the term of this patent is extended or adjusted under 35 U.S.C. 154(b) by 0 days.

(21) Appl. No.: 15/377,655

(22) Filed: Dec. 13, 2016

(65) Prior Publication Data
US 2018/0162317 A1 Jun. 14, 2018

(51) Int. Cl.
*B60R 21/26* (2011.01)
*B60R 21/261* (2011.01)

(52) U.S. Cl.
CPC .... *B60R 21/261* (2013.01); *B60R 2021/2612* (2013.01); *B60Y 2306/01* (2013.01)

(58) Field of Classification Search
CPC .......................... B60R 21/268; B60R 21/272
USPC ......................................................... 280/740
See application file for complete search history.

(56) References Cited

U.S. PATENT DOCUMENTS

| | | | |
|---|---|---|---|
| 3,891,233 A | 6/1975 | Damon | |
| 5,462,307 A * | 10/1995 | Webber | B60R 21/272 222/5 |
| 5,584,504 A | 12/1996 | Cuevas et al. | |
| 5,613,706 A | 3/1997 | Fischer | |
| 5,615,912 A * | 4/1997 | O'Loughlin | B60R 21/272 102/531 |
| 5,615,913 A * | 4/1997 | Francis | B60R 21/26 280/740 |
| 5,670,738 A | 9/1997 | Storey et al. | |
| 5,671,945 A * | 9/1997 | Rhule | B60R 21/2171 280/728.2 |

(Continued)

FOREIGN PATENT DOCUMENTS

EP          1 911 636 A1    4/2008
WO    WO 2006/130848 A2   12/2006

OTHER PUBLICATIONS

U.S. Patent Office, English language version of the International Search Report, Form PCT/ISA/210 for International Application PCT/US17/65745, dated Jul. 2, 2018 (2 pages).

*Primary Examiner* — Toan C To
(74) *Attorney, Agent, or Firm* — Pauley Erickson & Kottis

(57) ABSTRACT

Methods, devices and/or features which in addition to circumferential thrust neutrality additionally facilitate, permit or provide for thrust vector tuning of the inflation gas discharge from an inflator device. An end diffuser includes a diffuser wall defining a diffuser chamber for initially accepting inflation gas from a gas-providing portion of the inflator device. The diffuser wall includes a cylindrical portion having a plurality of inflation gas discharge openings disposed in a circumferential thrust neutral gas discharge array for discharging inflation gas from the diffuser chamber and an end wall portion forming a closed end to the diffuser. The end wall portion includes a protrusion of selected shape and dimensions extending therefrom into the diffuser chamber to create an inflation gas flow altering annular ring within the diffuser chamber to selectively thrust vector tune the inflator device.

22 Claims, 2 Drawing Sheets

(56) References Cited

U.S. PATENT DOCUMENTS

| | | | | |
|---|---|---|---|---|
| 5,673,731 | A | * | 10/1997 | Green .................. B60R 21/272 141/100 |
| 5,844,164 | A | * | 12/1998 | Cabrera ................ B60R 21/261 102/288 |
| 5,941,563 | A | * | 8/1999 | Schoenborn .......... B60R 21/261 280/736 |
| 6,019,389 | A | | 2/2000 | Burgi et al. |
| 6,068,289 | A | | 5/2000 | Bosio |
| 6,422,600 | B1 | | 7/2002 | Crohn et al. |
| 7,438,314 | B2 | | 10/2008 | Duvacquier et al. |
| 7,938,443 | B1 | * | 5/2011 | Smith .................. B60R 21/261 280/736 |
| 9,205,802 | B1 | * | 12/2015 | Lang .................... B60R 21/268 |
| 2004/0232680 | A1 | | 11/2004 | Goetz |
| 2010/0230942 | A1 | | 9/2010 | Rose et al. |
| 2012/0187668 | A1 | | 7/2012 | Lewis et al. |

\* cited by examiner

THRUST VECTOR TUNING OF INFLATOR DEVICES

BACKGROUND OF THE INVENTION

Field of the Invention

This invention relates generally to inflator devices such as used in vehicle passenger safety restraint systems and, more particularly, to features and methods useful to appropriately thrust vector tune inflator devices.

Discussion of Related Art

It is well known to protect a vehicle occupant by or with safety restraint systems which self-actuate from an undeployed or static state to a deployed state without requiring intervention by the operator. Thus, there is a need for as well as and improvements in or associated with "passive restraint systems." Such systems commonly contain or include an inflatable vehicle occupant restraint or element, such as in the form of a cushion or bag, commonly referred to as an "airbag cushion." in practice, such airbag cushions are typically designed to inflate or expand with gas when the vehicle encounters a sudden deceleration, such as in the event of a collision. Such airbag cushion(s) may desirably deploy into one or more locations within the vehicle between the occupant and certain parts of the vehicle interior, such as the doors, steering wheel, dashboard or the like, to prevent or avoid the occupant from forcibly striking such parts of the vehicle interior.

Inflatable safety restraint installations typically employ an inflator device to supply or produce inflation gas for inflating the inflatable airbag in the event of a collision. Many types of inflator devices have been disclosed in the art for inflating an inflatable restraint system airbag cushion. One category of such inflator devices is often referred to as "compressed gas inflators" and generally refers to various inflator devices which contain compressed gas.

As is known, one particular type of compressed gas inflator, sometimes referred to as a "stored gas inflator," simply contains a quantity of a stored compressed gas which is selectively released to inflate an associated airbag cushion.

Another known type of compressed gas inflator is commonly referred to as a "hybrid" inflator. In such an inflator device, inflation gas results from a combination of stored compressed gas and the combustion of a gas generating material, e.g., a pyrotechnic.

There is a need and a desire for airbag inflators that are smaller and lighter with equivalent performance output as compared to existing inflators, particularly in view of the growing use and incorporation of inflator devices in vehicles such as compressed gas airbag inflators for use or application in side and curtain inflatable safety restraint systems. Increasing storage pressure of the stored gas within the inflator device can be an effective technique to meet this need. This has led to the development of a new generation of side and curtain inflator devices that are smaller and lighter but which devices provide equivalent output performance via devices having gas storage pressures increased by 10%, 20%, 25%, or more, such as with inflator devices filled to or with pressures at or above 10,000 psi.

The release of inflation gas from an inflator device, however, imposes a substantial amount of reactive thrust, typically requiring the inflator device and associated assemblies to be securely restrained in the vehicle in which the assembly is employed. The restraint that secures the inflator to the vehicle absorbs the thrust.

The thrust resulting upon actuation of an inflator device can be significant, and can cause an inflator device to become a dangerous projectile if not properly restrained or rendered thrust neutral. Typically, during shipping and handling, before the installation of the assembly in a vehicle, physical restraint against the effects of reactive thrust is absent. As a result, unless an inflator device is thrust neutral, the unintended discharge of inflation gas from the inflator can present serious safety concerns. Accordingly, if an unrestrained inflator is unintentionally ignited during shipping, handling, or installation an unsafe situation can occur.

To address this need it is known to include or incorporate a diffuser element or device in or with an inflator device, e.g., an inflation gas-providing inflator housing, and which diffuser features circumferentially diametrically opposed holes that release inflation gas in a substantially circumferentially thrust neutral manner.

See, for example, FIG. 1 which illustrates a current design side and curtain compressed gas inflator device, generally designated by the reference numeral 10. The inflator device 10 has a generally elongated axially extending form that includes an inflation gas-providing inflator housing 12, with an end diffuser 14 disposed at an axial end 16.

The diffuser 14 includes a diffuser wall 20 that defines a diffuser chamber 22. As a part of the diffuser 14, the inflator housing 12 or both, the inflator device 10 includes a flow control orifice 24 for passage of inflation gas from the inflator housing 12 into the diffuser 14, particularly, into a diffuser cavity or chamber 22 formed thereby.

The diffuser wall 20 includes a cylindrical portion 26 having a plurality of inflation gas discharge openings or holes 28 disposed in a circumferential thrust neutral gas discharge array for discharging inflation gas from the diffuser chamber 22. The diffuser wall 20 also includes an end wall portion 30 that forms a closed end 32 to the diffuser 14.

However, as shown in FIG. 2, while such an inflator device can effectively address thrust neutrality in a circumferential manner, there still exists an axial thrust (represented by the arrow 40) shown as gas is released through the flow control orifice 24 into the internal diffuser cavity or chamber 22 and through the diametrically opposed holes 28, with arrows 42 representing the general gas flow exiting the diffuser in the plane of the page. The axial thrust arrow shown in FIG. 2 represents a negatively directed axial thrust (e.g., an axial thrust towards the left on the plane of the page). Inflator devices with oppositely, i.e., positively directed axial thrusts, are also possible.

As will be appreciated by those skilled in the art and guided by the teachings herein provided, the presence or occurrence of such axial thrust can become more pronounced and significant with higher gas storage pressure inflator devices such as are being developed.

Thus, there is a need for methods, devices and/or features which additionally facilitate, permit or provide for thrust vector tuning of the inflation gas discharge from an inflator device and, in specific instances, facilitate, permit or provide for thrust vector tuning of the inflation gas discharge from an inflator device.

There is also a need for methods, devices and/or features such as can be used to essentially cancel out axial thrust thereby resulting in or otherwise providing an inflator device that is devoid of thrust.

SUMMARY OF THE INVENTION

In accordance with one aspect or embodiment of the development, a new and innovative feature geometry is provided that provides for tuning inflator device thrust magnitude and direction. In one example, a suitable such innovative feature geometry comprises an internal cylindrical protrusion that effectively creates an annular ring that alters the gas flow within the internal diffuser cavity. When the flow inside of the diffuser is altered, the resultant thrust created by the gas as it exits the diffuser is accordingly also altered. Features, such as the diameter and/or length of the internal cylindrical protrusion, can be tailored to appropriately alter gas flow patterns within the internal diffuser cavity geometry. This results in changes of magnitude and direction of the resultant thrust vector.

In accordance with one aspect or embodiment, an end diffuser for an inflator device of an inflatable restraint system is provided. The end diffuser includes a diffuser wall that defines a diffuser chamber for initially accepting inflation gas from a gas-providing portion of the inflator device. The diffuser wall includes a cylindrical portion having a plurality of inflation gas discharge openings disposed in a circumferential thrust neutral gas discharge array for discharging inflation gas from the diffuser chamber. The diffuser wall also includes an end wall portion to form a closed end to the diffuser. The end wall portion includes a protrusion extending therefrom into the diffuser chamber to create an inflation gas flow altering annular ring within the diffuser chamber to selectively thrust vector tune the inflator device.

In accordance with another aspect or embodiment, there is provided an inflator device for an inflatable restraint system. The inflator device includes an inflation gas-providing inflator housing and an end diffuser disposed at a first end of the inflator housing. The end diffuser includes a diffuser wall defining a diffuser chamber for initially accepting inflation gas from the inflator device. The diffuser wall includes a cylindrical portion having a plurality of inflation gas discharge openings disposed in a circumferential thrust neutral gas discharge array for discharging inflation gas from the diffuser chamber. The diffuser wall also includes an end wall portion continuously formed and extending from the cylindrical portion and forming a closed end to the diffuser. The end wall portion includes a cylindrical protrusion extending therefrom into the diffuser chamber to create an inflation gas flow altering annular ring within the diffuser chamber whereby inflation gas discharged through the inflation gas discharge openings is discharged in an axial thrust neutral manner.

In accordance with yet another aspect or embodiment, there is provided a method for affecting at least one of magnitude and direction of inflation gas thrust exiting an inflator device end diffuser. The diffuser includes a diffuser wall defining a diffuser chamber for initially accepting inflation gas from the inflator device. The diffuser wall includes a cylindrical portion having a plurality of inflation gas discharge openings disposed in a circumferential thrust neutral gas discharge array for discharging inflation gas from the diffuser chamber. The diffuser wall also includes an end wall portion forming a closed end to the diffuser. The method involves or requires incorporating a protrusion extending from the end wall portion of the diffuser wall into the diffuser chamber to create an inflation gas flow altering annular ring within the diffuser chamber and selectively altering at least one of depth and width of the protrusion extending into the diffuser chamber to selectively thrust vector tune the inflation gas output from the inflator device.

Other objects and advantages will be apparent to those skilled in the art from the following detailed description taken in conjunction with the appended claims and drawings.

BRIEF DESCRIPTION OF THE DRAWINGS

FIG. 3 is a simplified side view, partially in section, of an inflator device in accordance with one aspect of the development.

FIG. 5 is a simplified side view, partially in section, of an inflator device in accordance with an alternative embodiment.

DETAILED DESCRIPTION OF THE INVENTION

Figure 1:
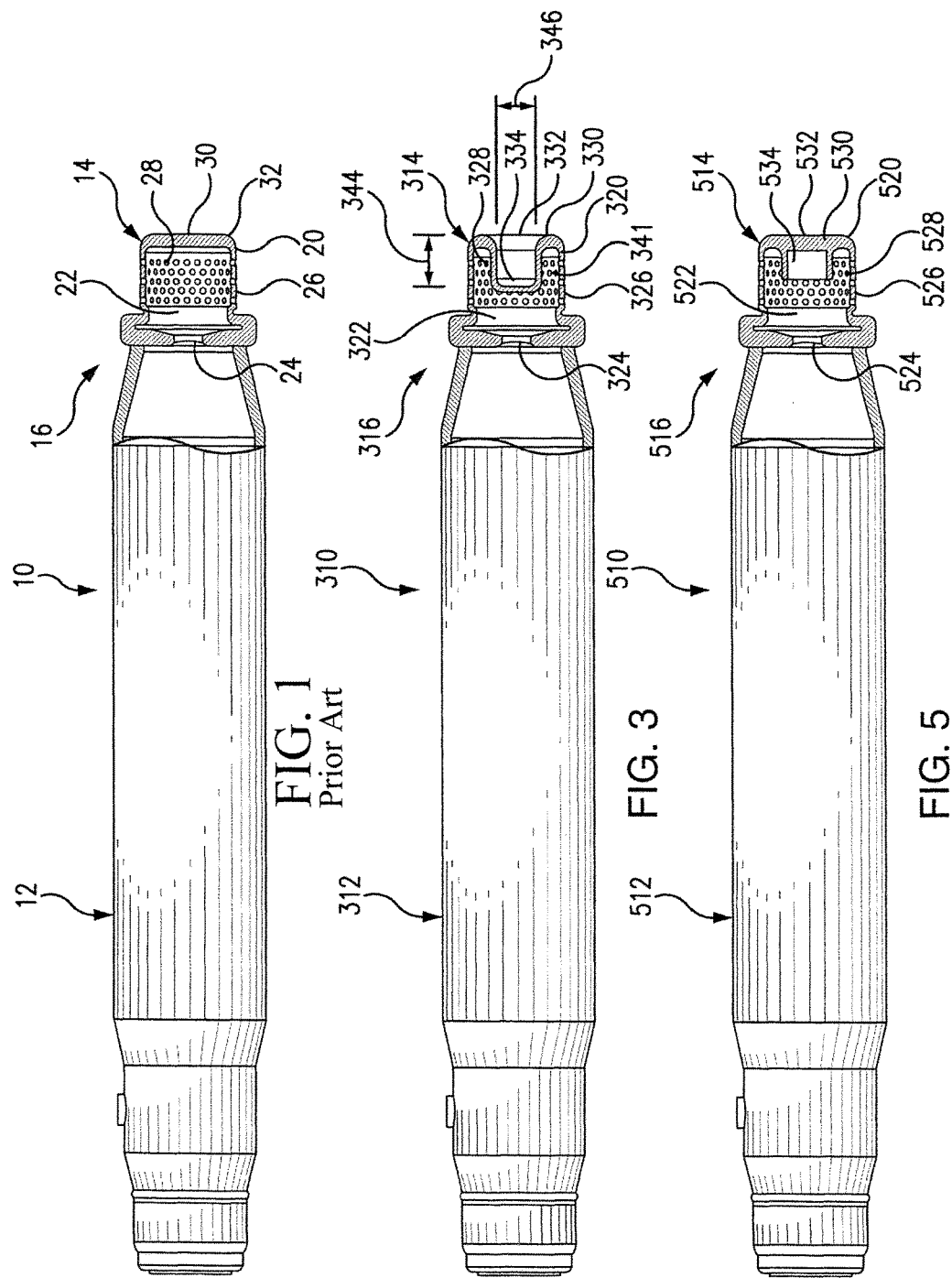
FIG. 1 is a simplified side view, partially in section, of a current design side and curtain compressed gas inflator device.
Figure 2:
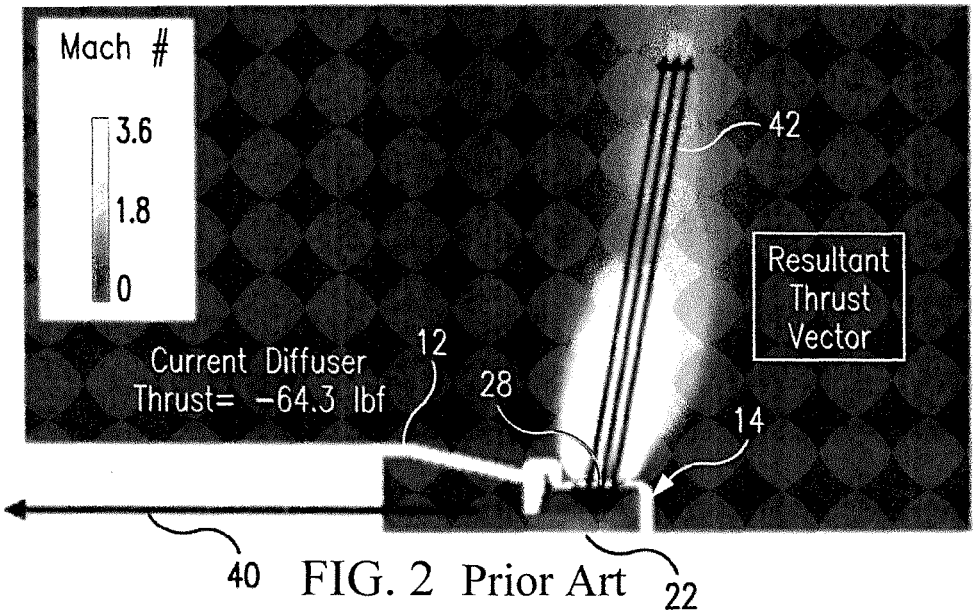
FIG. 2 is a fragmentary cross-sectional view of the diffuser end portion of the compressed gas inflator device shown in FIG. 1 and showing gas flow discharge therefrom.

The subject development provides methods, devices and/or features which in addition to circumferential thrust neutrality additionally facilitate, permit or provide for thrust vector tuning of the inflation gas discharge from an inflator device and, in specific instances, facilitate, permit or provide for thrust vector tuning of the inflation gas discharge from an inflator device such that in addition to circumferential thrust neutrality provides inflation gas discharge in an axial thrust neutral manner.

Moreover, while the subject development is sometimes discussed and described further below making specific reference to embodiments focused on or directed to providing or rendering a subject inflator such that the inflation gas discharge therefrom is in an axial thrust neutral manner those skilled in the art and guided by the teaching herein provided will understand and appreciate that the broader practice of the subject development is not necessarily so limited as, for example, the subject development can, if desired, be suitably practiced or applied, such as by manipulating attributes of the internal protrusion, to form, produce or result in an inflator device having or providing a resultant axial thrust vector created by the gas exiting the diffuser such that a specific and desired magnitude and direction (e.g., positive or negative) of thrust is achieved.

While the development is discussed and described below making specific reference to side and curtain compressed gas inflator devices as such application is of particular interest, those skilled in the art and guided by the teachings herein provided will understand and appreciate that the broader practice of the development is not necessarily so limited as the incorporation and use in other types of inflator devices are also herein encompassed.

FIG. 3 is a simplified side view, partially in section, of a side and curtain compressed g a s inflator device, generally designated by the reference numeral 310, in accordance with one aspect of the development. Similar to the inflator device 10 described above, the inflator device 310 has a generally elongated axially extending form that includes an inflation gas-providing inflator housing 312 and has an end diffuser 314 disposed at an axial end 316.

The end diffuser 314 includes a diffuser wall 320 that defines a diffuser chamber 322. As a part of the diffuser 314, the inflator housing 312 or both, the inflator device 310 includes a flow control orifice 324 for passage of inflation gas from the inflator housing 312 into the diffuser 314, particularly, into a diffuser cavity or chamber 322 formed thereby.

The diffuser wall 320 includes a cylindrical portion 326 having a plurality of inflation gas discharge openings or holes 328 disposed in a circumferential thrust neutral gas discharge array for discharging inflation gas from the diffuser chamber 322. The diffuser wall 320 also includes an end wall portion 330 that forms a closed end 332 to the diffuser 314.

Figure 4:
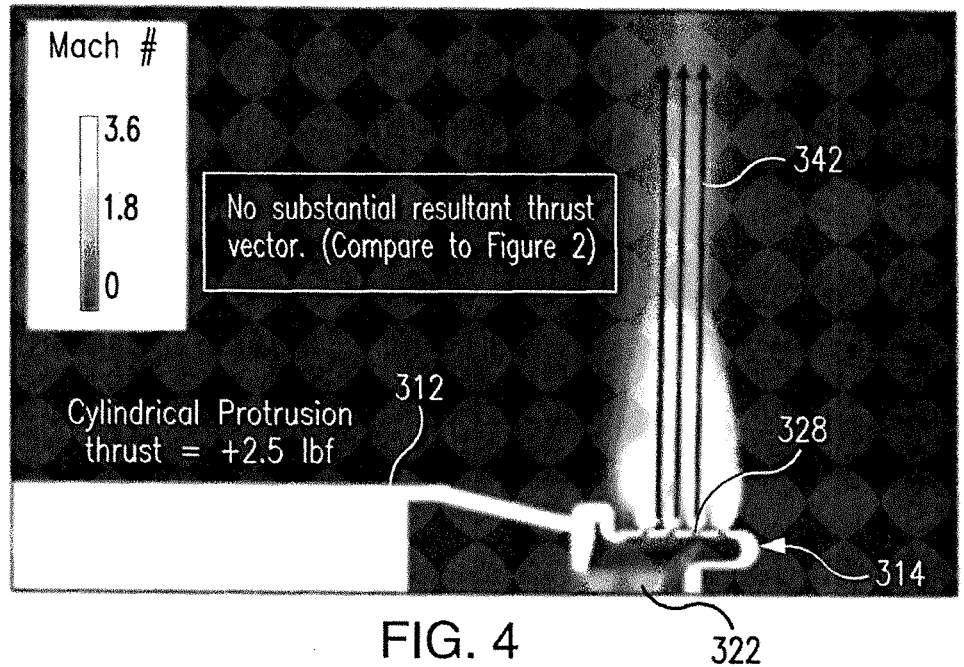
FIG. 4 is a fragmentary cross-sectional view of the diffuser end portion of the compressed gas inflator device shown in FIG. 3 and showing gas flow discharge therefrom.

The inflator device 310 primarily differs from the inflator device 10 described above in that the diffuser end wall portion 330 also includes a protrusion 334 extending therefrom into the diffuser chamber 332. As perhaps best viewed by reference to FIG. 4, such inclusion of the protrusion 334 serve to create an inflation gas flow altering annular ring 341 within the diffuser chamber 332 whereby inflation gas discharged through the inflation gas discharge openings 328 is discharged in an axial thrust neutral manner. In FIG. 4, the arrows 342 represent the general gas flow exiting the diffuser 314 in the plane of the page. As such arrows are substantially perpendicular to the diffuser 314 and the elongated axis of the inflator device 310, such discharge is axially thrust neutral.

Those skilled in the art and guided by the teachings herein provided will further appreciate that by selectively altering the size of the protrusion, e.g., such as either or both the depth, such as represented by the reference numeral 344, to which the protrusion 334 extends into the diffuser chamber 332 and the width, such as represented by the reference numeral 346, of the protrusion 334, the thrust vector of the inflation gas output from the inflator device can be appropriately selectively altered.

While the subject development has been described above making specific reference to an embodiment wherein the protrusion has a solid cylindrical form such as extends into the diffuser chamber, the broader practice of the invention is not necessarily so limited. For example, now turning to FIG. 5, there is shown a side and curtain compressed gas inflator device, generally designated by the reference numeral 510, in accordance with an alternative embodiment.

The inflator device 510 is generally similar to the inflator device 310 described above and has a generally elongated axially extending form that includes an inflation gas-providing inflator housing 512 and has an end diffuser 514 disposed at an axial end 516. The end diffuser 514 includes a diffuser wall 520 that defines a diffuser chamber 522. As a part of the diffuser 514, the inflator housing 512 or both, the inflator device 510 includes a flow control orifice 524 for passage of inflation gas from the inflator housing 512 into the diffuser 514, particularly, into a diffuser cavity or chamber 522 formed thereby. The diffuser wall 520 includes a cylindrical portion 526 having a plurality of inflation gas discharge openings or holes 528 disposed in a circumferential thrust neutral gas discharge array for discharging inflation gas from the diffuser chamber 522. The diffuser wall 520 also includes an end wall portion 530 that forms a closed end 532 to the diffuser 514. While the inflator device 510 also similarly includes a protrusion 534 extending from the diffuser end wall portion 530 into the diffuser chamber 522, it differs in that the protrusion 534 is formed as an annular ring. If desired, such an annular ring protrusion can be formed as a separate component added to the assembly.

As identified above, in accordance with one aspect or embodiment of the development, one example of a suitable feature geometry that provides desired tuning of inflator device thrust magnitude and direction comprises an internal cylindrical protrusion that effectively creates an annular ring that alters the gas flow within the internal diffuser cavity. When the flow inside of the diffuser is altered, the resultant thrust created by the gas as it exits the diffuser is accordingly also altered. Features, such as the diameter and/or length of the internal cylindrical protrusion, can be tailored to appropriately alter gas flow patterns within the internal diffuser cavity geometry. This results in changes of magnitude and direction of the resultant thrust vector.

The following specific examples are discussed and described to further assist and guide those skilled in the art in the practice and application of the subject development. It is to be understood, however, that the broader practice of the subject development is not necessarily limited to or restricted by these examples.

Example 1

When the diameter of the internal cylindrical protrusion is approximately 50% of the diameter of the cylindrical portion of the diffuser having a plurality of gas diffusing exit holes, and when the length of the internal cylindrical protrusion is approximately 50% of the length of the cylindrical portion of the diffuser having a plurality of gas diffusing exit holes, in accordance with one preferred embodiment, axial thrust can be essentially zeroed out.

Example 2

When the diameter of the internal cylindrical protrusion is approximately 50% of the diameter of the cylindrical portion of the diffuser having a plurality of gas diffusing exit holes, and when the length of the internal protrusion is approximately 25% of the length of the cylindrical portion of the diffuser having a plurality of gas diffusing exit holes, gas flow inside of the diffuser is altered and resultant axial thrust of the inflator device that is created as the gas exits the plurality of holes is thus tuned or adjusted such that a small magnitude of axial thrust of the inflator device exists in a net negative direction (e.g., opposed direction).

Example 3

When the diameter of the internal cylindrical protrusion is approximately 25% of the diameter of the cylindrical portion of the diffuser having a plurality of gas diffusing exit holes, and when the length of the internal cylindrical protrusion is approximately 50% of the length of the cylindrical portion of the diffuser having a plurality of gas diffusing exit holes, gas flow inside of the diffuser is altered and resultant axial thrust of the inflator device that is created as the gas exits the plurality of holes is thus tuned such that a small magnitude axial thrust of the inflator device exists in a net negative direction (e.g., opposed direction). Thus, in accordance with at least one embodiment, either or both the diameter and length of the cylindrical protrusion can be manipulated independently or in conjunction with each other, to fine tune resultant thrust in the net negative direction by reducing the size of the feature.

Example 4

When the diameter of the internal cylindrical protrusion is approximately 50% of the diameter of the cylindrical portion of the diffuser having a plurality of gas diffusing exit holes, and when the length of the internal protrusion is approximately 75% of the length of the cylindrical portion of the diffuser having a plurality of gas diffusing exit holes, gas flow inside of the diffuser is altered and resultant axial thrust of the inflator device that is created as the gas exits the plurality of holes is thus tuned such that a small magnitude of axial thrust of the inflator device exists in a net positive direction.

Example 5

When the diameter of the internal cylindrical protrusion is approximately 75% of the diameter of the cylindrical portion of the diffuser having a plurality of gas diffusing exit holes, and when the length of the internal cylindrical protrusion is approximately 50% of the length of the cylindrical portion of the diffuser having a plurality of gas diffusing exit holes, gas flow inside of the diffuser is altered and resultant axial thrust of the inflator device that is created as the gas exits the plurality of holes is thus tuned such that a small magnitude of axial thrust of the inflator device exists in a net positive direction.

Thus, in accordance with particular embodiments, either or both diameter and length of the cylindrical protrusion can be manipulated independently or in conjunction with each other, as may be desired, to appropriately fine tune resultant thrust in the net positive direction by increasing the size of the feature.

Example 6

When the diameter of the internal cylindrical protrusion is approximately 25% of the diameter of the cylindrical portion of the diffuser having a plurality of gas diffusing exit holes, and when the length of the internal protrusion is approximately 25% of the length of the cylindrical portion of the diffuser having a plurality of gas diffusing exit holes, gas flow inside of the diffuser is altered, and axial thrust created as the gas exits the plurality of holes is thus tuned causing axial thrust of the inflator device in a large net negative direction. Thus, both diameter and length of the cylindrical protrusion can be manipulated together to adjust or tune gross/larger magnitude resultant thrust in the net negative direction by decreasing the size of both attributes of the internal protrusion feature.

Example 7

When the diameter of the internal cylindrical protrusion is approximately 75% of the diameter of the cylindrical portion of the diffuser having a plurality of gas diffusing exit holes, and when the length of the internal protrusion is approximately 75% of the length of the cylindrical portion of the diffuser having a plurality of gas diffusing exit holes, gas flow inside of the diffuser is altered and axial thrust created as the gas exits the plurality of holes is thus tuned causing axial thrust of the inflator device in a large net positive direction. Thus, for example in accordance with one embodiment, both diameter and length of the internal cylindrical protrusion can be manipulated together to tune gross/ larger magnitude resultant thrust of the inflator device in the net positive direction by increasing the size of both attributes of the internal protrusion feature.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

As identified above, in accordance with a preferred practice of the subject development, the thrust vector of the inflation gas output from the inflator device can be appropriately selectively altered such as by selectively altering the size of the protrusion, e.g., such as by altering either or both the depth, such as represented by the reference numeral 344, to which the protrusion 334 extends into the diffuser chamber 332 and the width, such as represented by the reference numeral 346, of the of the protrusion 334.

Test inflator devices, similar in structure to the inflator device 310 described above were prepared and in which the only structural difference was the depth (e.g., measurement 344) of the respective protrusion and the axial thrust was determined.

The results are shown in TABLE 1, below.

TABLE 1

| Example | Depth of Protrusion "344" (mm) | Axial Thrust (lbf) |
| --- | --- | --- |
| 8 | 6.5 | −25.8 |
| 9 | 10 | 2.5 |
| 10 | 13.5 | 12.8 |

Discussion of Results

As shown by the results in TABLE 1, altering the size of the protrusion, e.g., such as by altering the depth to which the protrusion extends into the diffuser chamber, is an effective technique to or by which the thrust vector of a corresponding inflator device can be selectively tuned, as discussed above in greater detail.

Thus, the development provides methods, devices and/or features which in addition to circumferential thrust neutrality additionally facilitate, permit or provide for thrust vector tuning of the inflation gas discharge from an inflator device and, in specific instances, facilitate, permit or provide for thrust vector tuning of the inflation gas discharge from an inflator device such that in addition to circumferential thrust neutrality provides inflation gas discharge in an axial thrust neutral manner.

The claims are not intended to include, and should not be interpreted to include, means-plus- or step-plus-function limitations, unless such a limitation is explicitly recited in a given claim using the phrase(s) "means for" or "step for," respectively.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An inflator device of an inflatable restraint system, the inflator device comprising:
   an inflator housing;
   an end diffuser disposed at a first end of the inflator housing, and
   a single flow control orifice disposed between the inflator housing and the end diffuser;
   wherein the end diffuser comprises:
   a diffuser wall defining a diffuser chamber for initially accepting inflation gas from a gas-providing portion of the inflator device;
   the diffuser wall including a cylindrical portion having a plurality of inflation gas discharge openings disposed in a circumferential thrust neutral gas discharge array for discharging inflation gas from the diffuser chamber;
   the diffuser wall including an end wall portion forming a closed end to the diffuser; and
   the end wall portion including a protrusion extending therefrom into the diffuser chamber to create an inflation gas flow altering annular ring within the diffuser chamber to thrust vector tune the inflator device.

2. The inflator of claim 1 wherein the protrusion results in inflation gas discharged through the inflation gas discharge openings in an axial thrust neutral manner.

3. The inflator of claim 1 wherein the end wall portion is continuously formed and extending from the cylindrical portion.

4. The inflator of claim 3 wherein the protrusion is continuously formed as a portion of the diffuser wall.

5. The inflator of claim 4 wherein the protrusion is cylindrical.

6. The inflator of claim 4 wherein the protrusion comprises an indentation in the end wall portion.

7. The inflator of claim 1 wherein the protrusion is continuously formed as a portion of the diffuser wall.

8. The inflator of claim 7 wherein the protrusion is cylindrical.

9. The inflator of claim 7 wherein the protrusion comprises an indentation in the end wall portion.

10. The inflator of claim 1 wherein the protrusion is cylindrical.

11. The inflator of claim 1 wherein the protrusion comprises an indentation in the end wall portion.

12. The inflator of claim 1 wherein the cylindrical protrusion comprises an annular ring.

13. The inflator of claim 1 wherein the protrusion results in inflation gas discharged through the inflation gas discharge openings in a positive axial thrust direction.

14. The inflator of claim 1 wherein the protrusion results in inflation gas discharged through the inflation gas discharge openings in a negative axial thrust direction.

15. The inflator device of claim 1 wherein the inflator housing is an elongated axially extending inflation gas-providing inflator housing and the end diffuser is disposed at a first end of the elongated axially extending inflator housing.

16. An inflator device for an inflatable restraint system, the inflator device comprising:
   an inflation gas-providing inflator housing;
   an end diffuser disposed at a first end of the inflator housing, and
   a single flow control orifice disposed between the inflator housing and the end diffuser;
   wherein the end diffuser comprises:
   a diffuser wall defining a diffuser chamber for initially accepting inflation gas from the inflator device;
   the diffuser wall including a cylindrical portion having a plurality of inflation gas discharge openings disposed in a circumferential thrust neutral gas discharge array for discharging inflation gas from the diffuser chamber;
   the diffuser wall including an end wall portion continuously formed and extending from the cylindrical portion and forming a closed end to the diffuser; and
   the end wall portion including a cylindrical protrusion extending therefrom into the diffuser chamber to create an inflation gas flow altering annular ring within the diffuser chamber whereby inflation gas discharged through the inflation gas discharge openings is discharged in an axial thrust neutral manner.

17. The inflator device of claim 16 wherein the cylindrical protrusion is continuously formed as a portion of the diffuser wall.

18. The inflator device of claim 16 wherein the cylindrical protrusion comprises an annular ring.

19. The inflator device of claim 16 wherein the inflation gas-providing inflator housing is an elongated axially extending inflation gas-providing inflator housing; and the end diffuser is disposed at a first end of the elongated axially extending inflator housing.

20. A method for tuning at least one of magnitude and direction of inflation gas thrust from an inflator device, the inflator device including an inflator housing, an end diffuser disposed at a first end of the inflator housing, and a single flow control orifice disposed between the inflator housing and the end diffuser; the end diffuser including a diffuser wall defining a diffuser chamber for initially accepting inflation gas from the inflator device, the diffuser wall including a cylindrical portion having a plurality of inflation gas discharge openings disposed in a circumferential thrust neutral gas discharge array for discharging inflation gas from the diffuser chamber, the diffuser wall including an end wall portion forming a closed end to the diffuser, the method comprising:
   incorporating a protrusion extending from the end wall portion of the diffuser wall into the diffuser chamber to create an inflation gas flow altering annular ring within the diffuser chamber; and
   altering at least one of depth and diameter of the protrusion extending into the diffuser chamber to thrust vector tune the inflation gas output from the inflator device.

21. The method of claim 20 wherein at least one of depth and diameter of the protrusion extending into the diffuser chamber is altered whereby inflation gas discharged through the inflation gas discharge openings is discharged in an axial thrust neutral manner.

22. The method of claim 20 wherein the inflator housing is an elongated axially extending inflation gas-providing inflator housing and the end diffuser is disposed at a first end of the elongated axially extending inflation gas-providing inflator housing.

* * * * *